United States Patent
Sahu et al.

(10) Patent No.: US 9,342,368 B2
(45) Date of Patent: *May 17, 2016

(54) MODULAR CLOUD COMPUTING SYSTEM

(75) Inventors: Sambit Sahu, Hopewell Junction, NY (US); Anca Sailer, Scarsdale, NY (US); Hidayatullah H. Shaikh, Mohegan Lake, NY (US)

(73) Assignee: International Business Machines Corporation, Armonk, NY (US)

(*) Notice: Subject to any disclaimer, the term of this patent is extended or adjusted under 35 U.S.C. 154(b) by 518 days.

This patent is subject to a terminal disclaimer.

(21) Appl. No.: 12/872,095

(22) Filed: Aug. 31, 2010

(65) Prior Publication Data

US 2012/0054345 A1 Mar. 1, 2012

(51) Int. Cl.
*G06F 15/16* (2006.01)
*G06F 9/50* (2006.01)
*G06F 9/445* (2006.01)
*H04L 29/08* (2006.01)

(52) U.S. Cl.
CPC ............... *G06F 9/5072* (2013.01); *G06F 8/61* (2013.01); *G06F 9/5044* (2013.01); *G06F 9/5055* (2013.01); *G06F 9/5077* (2013.01); *H04L 67/1002* (2013.01)

(58) Field of Classification Search
CPC ..... H04L 67/10; H04L 63/08; H04L 63/0218; H04L 63/1441; H04L 41/12; H04L 12/00
See application file for complete search history.

(56) References Cited

U.S. PATENT DOCUMENTS

| | | | |
|---|---|---|---|
| 6,292,905 B1 | 9/2001 | Wallach et al. | |
| 6,880,002 B2 | 4/2005 | Hirschfeld et al. | |
| 7,574,496 B2 | 8/2009 | McCrory et al. | |
| 8,001,214 B2 * | 8/2011 | Loefstrand | 709/217 |
| 2003/0163755 A1 | 8/2003 | Fung et al. | |
| 2003/0191838 A1 * | 10/2003 | Tsao | 709/225 |
| 2005/0268154 A1 | 12/2005 | Wipfel et al. | |
| 2006/0089992 A1 * | 4/2006 | Blaho | 709/227 |
| 2007/0005685 A1 * | 1/2007 | Chau et al. | 709/203 |
| 2008/0046995 A1 * | 2/2008 | Satterlee et al. | 726/15 |
| 2008/0080396 A1 | 4/2008 | Meijer et al. | |
| 2008/0080552 A1 | 4/2008 | Gates et al. | |
| 2009/0076749 A1 * | 3/2009 | Nasle | 702/62 |
| 2009/0199175 A1 * | 8/2009 | Keller et al. | 717/178 |
| 2009/0276771 A1 | 11/2009 | Nickolov et al. | |
| 2010/0125844 A1 | 5/2010 | Mousseau et al. | |
| 2010/0131654 A1 * | 5/2010 | Malakapalli et al. | 709/227 |
| 2010/0223378 A1 * | 9/2010 | Wei | 709/224 |
| 2011/0197184 A1 | 8/2011 | Sheehan | |
| 2013/0297800 A1 * | 11/2013 | Considine et al. | 709/226 |

OTHER PUBLICATIONS

OpenNebula (http://www.opennebula.org/doku.php), 3 pages.
A. Mulholland, "Changing the Game: Monthly Technology Briefs," Capgemini, Jan. 2010, 7 pages.
P. Mell et al., "The NIST Definition of Cloud Computing," National Institute of Standards and Technology, Version 15, Oct. 7, 2009, 2 pages.

* cited by examiner

*Primary Examiner* — Djenane Bayard
(74) *Attorney, Agent, or Firm* — Louis J. Percello; Ryan, Mason & Lewis, LLP

(57) ABSTRACT

In an illustrative embodiment, a computing system comprises a first computer coupled to one or more additional computers. Each of the one or more additional computers manages a respective set of one or more virtualized computing resources. The first computer manages the one or more additional computers.

21 Claims, 5 Drawing Sheets

MODULAR CLOUD COMPUTING SYSTEM

CROSS-REFERENCE TO RELATED APPLICATIONS

The present application is related to commonly-assigned U.S. patent application Ser. No. 12/872,110, filed concurrently herewith, which is incorporated by reference herein.

FIELD OF THE INVENTION

The present invention relates generally to cloud computing and, more particularly, to techniques for building and managing cloud computing infrastructures.

BACKGROUND OF THE INVENTION

Cloud computing includes a model for enabling convenient, on-demand network access to a shared pool of configurable computing resources (e.g., networks, servers, storage, applications, and services) that can be rapidly provisioned and released with minimal management effort or service provider interaction. Cloud computing is often characterized by on-demand self services, broad network access, resource pooling, rapid elasticity, and measured services.

For example, cloud computing could include an Infrastructure as a Service (IaaS) model, in which the consumer does not manage or control the underlying cloud infrastructure, but the customer is provided with a capability to provision processing, storage, networks, and other fundamental computing resources where the consumer is able to deploy and run arbitrary software, which can include operating systems and applications. Cloud computing is often used in conjunction with virtualized resources. Virtualization of a resource typically refers to an arrangement in which logical resources are abstracted from physical resources.

Cloud computing has received a great deal of attention recently, including the provision of several solutions from prominent information technology (IT) companies. Cloud computing has the potential to overhaul the way IT services and businesses are offered and conducted, thus providing significant cost savings and additional capabilities.

Part of the cost savings are due to the scale and level of automation provided in such a model. For example, in order to have cost savings in an Infrastructure as a Service (IaaS) model, one may need at least 20,000 computer servers. Indeed, many established IaaS providers have more than 100,000 servers as part of the cloud. However, building and managing such a large system presents a number of challenges.

SUMMARY OF THE INVENTION

Principles of the invention provide techniques for building and maintaining a computing infrastructure. While not intended to be limited thereto, such techniques are particularly suitable for application to an cloud computing infrastructure implementing an IaaS model.

In an illustrative embodiment, a cloud computing system comprises a first computer coupled to one or more additional computers. Each of the one or more additional computers manages a respective set of one or more virtualized computing resources. The first computer manages the one or more additional computers.

Illustrative embodiments of the present invention advantageously provide an infrastructure management methodology for managing large numbers of highly virtualized resources, which can reside in multiple locations, so that they resemble a single large resource that can be used to deliver services. For example, illustrative embodiments advantageously provide a modular approach such that very large scale infrastructures can be built incrementally. Thus, illustrative embodiments can be adapted to future needs to grow to even larger scales, both in size and functionality. Moreover, illustrative embodiments could allow a cloud provider to add additional resources without disrupting the existing available services.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As heretofore discussed, the term "cloud computing" is typically defined as a computing capability that provides an abstraction, or virtualization, between the computing resource and its underlying technical architecture (e.g., servers, storage, networks), enabling convenient, on-demand network access to a shared pool of configurable computing resources that can be rapidly provisioned and released with minimal management effort or service provider interaction. It is to be understood that principles of the invention are not intended to be limited to any particular definition of cloud computing, and that other suitable computing environments are contemplated as being within the scope of the invention.

Figure 1:
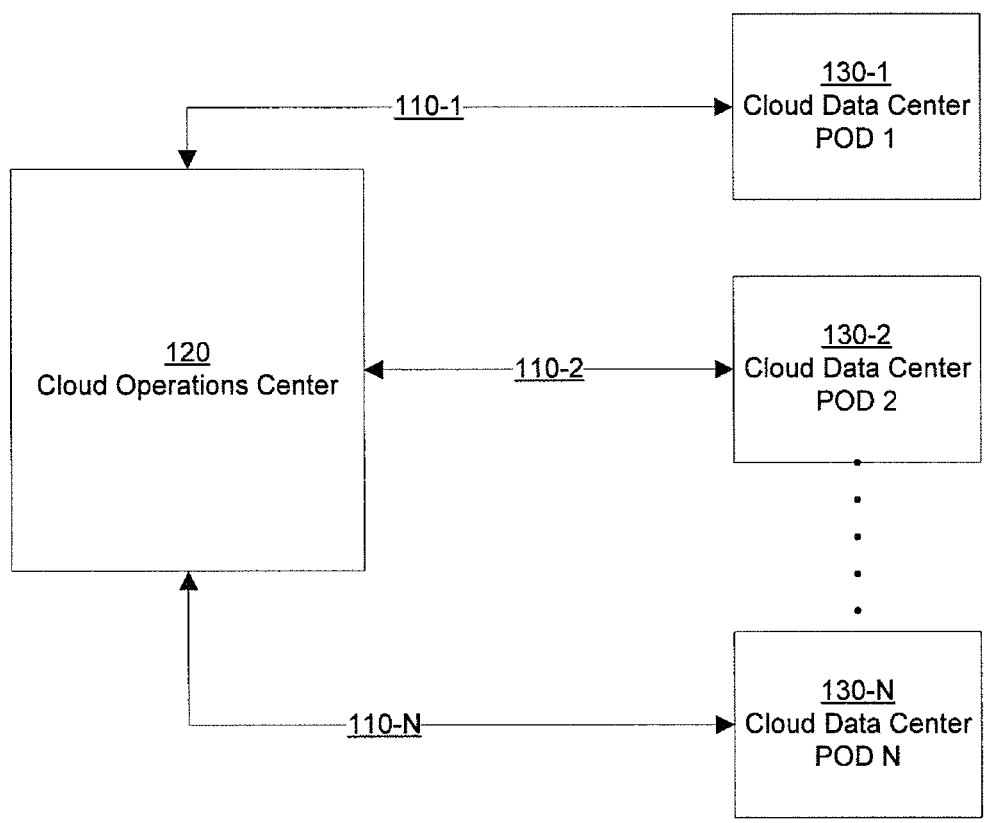
FIG. 1 shows an exemplary embodiment of a cloud computing system in accordance with an illustrative embodiment of the present invention.

FIG. 1 shows an exemplary embodiment of a cloud computing system 100 in accordance with an illustrative embodiment of the present invention. The exemplary system 100 includes a Cloud Operations Center 120 coupled to one or more data center point-of-deployment (POD) systems numbered 130-1, 130-2 to 130-N via respective connections 110-1, 110-2 to 110-N. Typically, the Cloud Operations Center and each POD system will comprise one or more computing systems, as will be discussed in greater detail with reference to FIG. 5.

More particularly, each POD system is typically responsible for a set of virtualized resources, which may include a data center comprising servers, storage and network equipment. The POD system may include management applications to control this set of virtualized resources in order to support a customer's IT requirements to run their business. A POD system may include a front end console application. A POD system may be shipped to the customer or it may he hosted at a provider's data center.

Connections 110 may be via the Internet, an intranet and/or an extranet, for example. Alternatively or in addition, one or more of the connections 110 could be a network cable in an embodiment in which one or more of the POD systems 130 is local to the Cloud Operations Center 120. Generally, performance and availability data is transmitted from each POD system 130 to the Cloud Operations Center 120, and in turn delegated actions are transmitted from the Cloud Operations Center 120 to the respective POD systems 130. Examples of these delegated actions include upgrades to software in a POD system, fixes for problems reported in the POD system, and remote installations.

The Cloud Operations Center 120 may be clustered for high availability and disaster reliability. The POD systems 130 may also be clustered and/or distributed for performance, availability and reduced latency. The POD systems 130 may be associated with either a service provider or a customer.

In contrast to conventional techniques in which management of a computing system is either centralized or distributed, an illustrative embodiment of the present invention provides a separation of end-to-end management responsibilities between the front-end Cloud Operations Center 120 and the respective POD systems 130. Generally, each POD system 130 is operative to manage a set of virtualized resources. For example, a given POD could provide management of infrastructure, configuration, provisioning, releases, changes, incidents, problems, capacity, service levels, availability, and service desk issues associated with a corresponding set of virtualized resources (e.g., a data center).

The Cloud Operations Center 120 is operative to manage the overall cloud computing infrastructure. For example, Cloud Operations Center 120 could provide business support services (e.g., revenue management and customer management), as well as services catalog management.

Resource-specific management is handled at the POD system level so that higher-level intelligent orchestration of a requested service is managed at the front-end Cloud Operations Center 120 without requiring server-specific information at the Cloud Operations Center 120. For example, the Cloud Operations Center 120 requires no knowledge of the specific physical resources associated with each POD.

Figure 2:
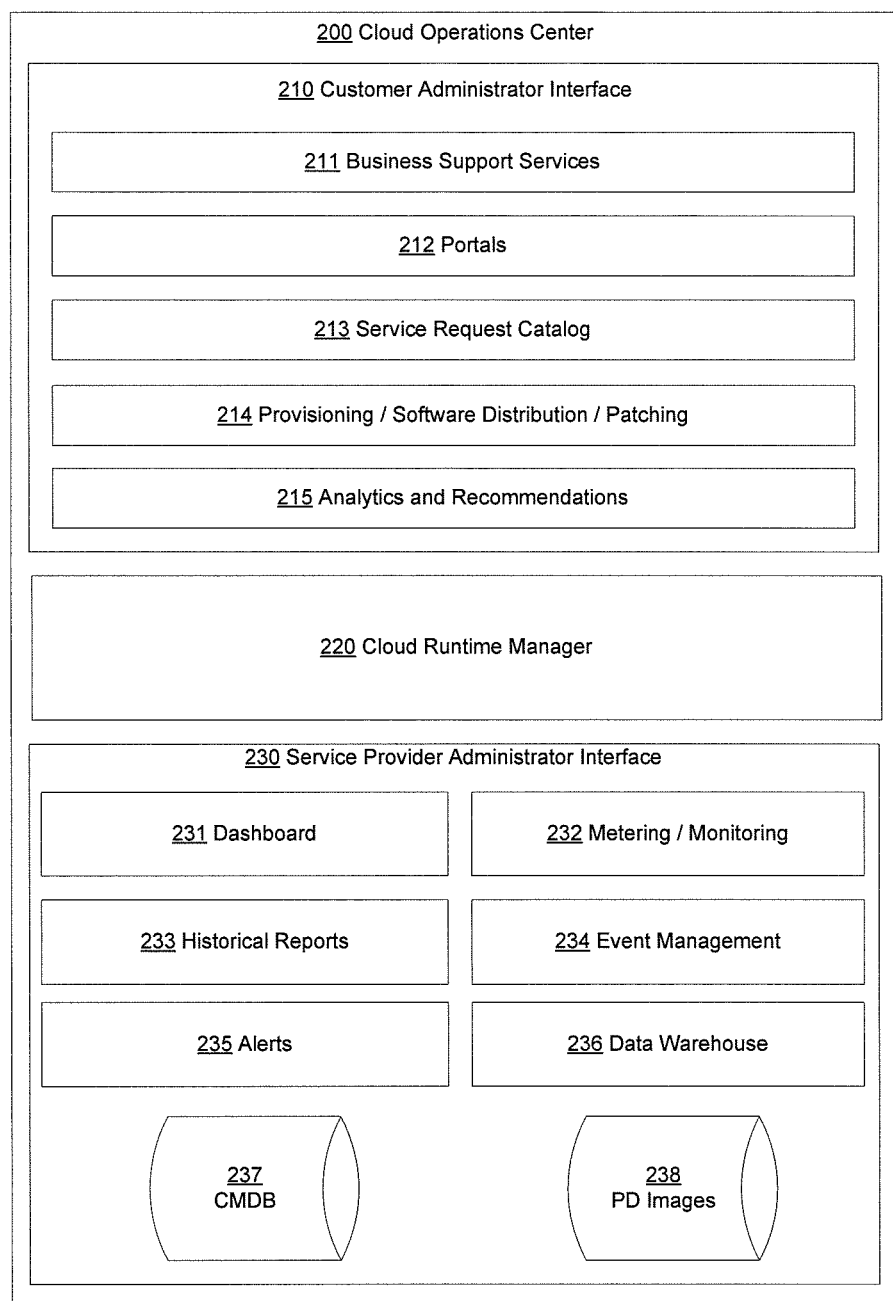
FIG. 2 shows an exemplary Cloud Operations Center in accordance with an illustrative embodiment of the present invention.

For example, as will be discussed further with reference to FIG. 2, Cloud Operations Center 120 handles service requests from users and orchestrates the end-to-end workflow to facilitate that request. For example, customer requirements for a service could be collected through a front end portal of the Cloud Operations Center, then the customer requirements could be sent to an operation layer to provision resources in order to provide the customer with the requested service.

A service request refers to a request by a user for a specified service offering, typically in accordance with a service level agreement. Typically, a service request will be based on a service offering selected from a service catalog, which enumerates various service offerings. Examples of service requests include a request for a desktop service, computing infrastructure, or storage service. More generally, a service request will typically entail provisioning of a specified computing infrastructure or platform. One could request a specified number of units of one or more virtualized computing resources (e.g., processor resources, storage resources, or network resources). For example, one may request 50 gigabytes of storage space or 300 megabytes per second of network bandwidth. One could also request access to a specified computing platform or software package, which in turn would require provisioning of virtualized computing resources, such as processor and memory resources.

The Cloud Operations Center 120 will also define a set of clearly identified application program interfaces (APIs) that a POD system 130 should support for modularity. As will be discussed further with reference to FIG. 3, each POD system 130 represents a self-sufficient and modular unit which is associated with a given set of resources. The POD system 130 performs all resource-level management for its associated resources, thereby hiding these lower-level management specifics from the front-end Cloud Operations Center 120. In some embodiments, these POD systems may represent diverse application-specific resources. For example, POD system 130-1 could be a healthcare POD system similar to that described hereinbelow with reference to FIG. 4, while POD system 130-2 could be a transportation POD system as will be discussed herein.

This modular approach allows one to add or remove POD systems 130 without requiring an overhauling of existing management infrastructures. More particularly, each POD system 130 is designed in a self-contained manner such that additional POD systems 130 can be added to the existing ones without requiring any changes to the existing POD systems. Rather, only the configuration at the Cloud Operation Center 120 needs to be updated to accommodate the additional POD system 130. Likewise, POD systems can be removed without requiring changes to the remaining POD systems.

The Cloud Operations Center 120 keeps track of statistics about each POD system 130 so as to make intelligent decisions about where to dispatch the request to provision or facilitate the requested resources or services. These decisions could be based not only on workload, but also on business level aspects such as cost and QoS. These decisions could also take into account capabilities of the various POD systems, such as industry-specific capabilities associated with one or more of these POD systems, as discussed hereinbelow. The Cloud Operations Center would have sufficient information to map requests into cloud specific operations. This information could, for example, be hierarchical in nature.

Once the request is mapped to specific cloud resources and operations, Cloud Operations Center 120 will contact a POD system or a set of POD systems with the request and workflow details to actuate the provisioning of the requested service on the physical resources. This resource-level provisioning is carried out locally by the POD system 130 itself as it has the knowledge of the resources locally available in the POD system. It should be noted that this provisioning may include one POD system operating in a peer-to-peer manner with one or more other POD systems FIG. 2 shows an exemplary architecture for a Cloud Operations Center 200 suitable for use in an embodiment of the present invention. For example, Cloud Operations Center 200 in FIG. 2 could be a more detailed view of Cloud Operations Center 120 in FIG. 1.

Cloud Operations Center 200 comprises three main components: Customer Administrator Interface 210, Cloud Runtime Manager 220, and Service Provider Administrator Interface 230. Generally, the Customer Administrator Interface 210 provides functionality to end users (e.g., customers of the service provider) while the Service Provider Administrator Interface 230 provides functionality to an administrator of the cloud computing infrastructure (e.g., the service provider itself).

The Customer Administrator Interface 210 comprises Business Support Services module 211, Portal module 212, Service Request Catalog module 213, Provisioning module 214, and Analytics module 215.

Business Support Services module 211 provides various business support services to users of the cloud computing infrastructure, such as customer management and revenue management. Portal module 212 allows users of the cloud to request cloud services. Examples of these cloud services include creating a new virtual machine (VM) with an image, deleting a resource, or modifying an existing resource. Service Request Catalog module 213 provides intelligence to map an incoming user request to cloud-specific requirements, including the ability to identify which POD system should support this request. Service Request Catalog 213 also provides an interface that allows users/customers to select, size and order the services they want. Service Request Catalog 213 may comprise, for example, a list of available service offerings which the user may select and customize.

Provisioning module 214 allows for remote management of the resources so as to facilitate cloud services. For example, Provisioning module 214 works with Service Request Catalog 213 by translating the user's request for a service—for example, a test environment with specified characteristics—into a specific infrastructure configuration. Provisioning module 214 is also operative to distribute of new and updated software, such as software patches. Analytics module 215 provides analytics and recommendations to support business level analysis, for example, to help minimize risk, maximize value and align IT and business objectives.

Cloud Runtime Manager 220 is the core module that provides service monitoring and management for the cloud computing infrastructure. Cloud Runtime Manager 220 is a common resource to the Customer Administrator Interface 210 and the Service Provider Administrator Interface 230. Once a customer is subscribed to a service and that is deployed and running, both the customer's IT administrator and the service provider administrator can access the Cloud Runtime Manager 220, e.g. via web services or programmatic APIs, in order to manage the service.

Service Provider Administrator Interface 230 includes Dashboard module 231, Metering/Monitoring module 232, Historical Reports module 233, Event Management module 234, Alerts module 235, and Data Warehouse module 236. Service Provider Administrator Interface 230 also includes a configuration management database (CMDB) 237 and a set of images 238 for problem determination (PD).

Dashboard module 231 provides a user interface for the administrator of the cloud computing infrastructure to the other modules described herein. Metering/Monitoring module 232 is operative to obtain performance and availability data from the POD systems 130. Metering/Module module 232 also tracks actual usage according to defined metrics and translates them into either an internal charge-back transaction or a bill.

Generally, the Cloud Operation Center will perform high-level monitoring for the POD systems which it supervises. More particularly, the Cloud Operations Center tracks and keeps data related to the functional capabilities of each POD system as well as high-level POD system state information, including but not limited to, processor utilization and storage capacity.

Historical Reports module 233 tracks the performance of the POD systems 130 over time to allow for determination of changes, such as gradual deteriorations in system performance. Event Management module 234 provides for management of both routine and unexpected events. Alerts module 235 generates alerts to the administrator when necessary, such as when an error condition occurs. For example, a breach of pre-established thresholds may automatically trigger the deployment of an additional POD system.

Data Warehouse module 236 provides data warehouse operations for management optimization. Element 237 is a CMDB which includes elements representing the configurations of various elements of the cloud computing infrastructure and which may be used in, for example, change management.

Element 238 is a PD image repository that stores system checkpoint snapshots of specific POD system software products. These snapshot images are typically labeled as either a correct image or as indicative of a problem type. These snapshot images may include attachments such as, for example, error descriptions and suggested remediation. During the deployment of a POD system, the installation of software is validated against the related images in the PD repository. If the deployment intermediary image matching an image in the PD repository labeled "correct image," the deployment continues. Otherwise, if a "problem" image is matched, the deployment follows the corresponding attached workflow to solve the problem. Depending on the problem type, the remediation can include an automated restart of deployment, rollout to a previous correct intermediary image, or a suite of manual actions.

Figure 3:
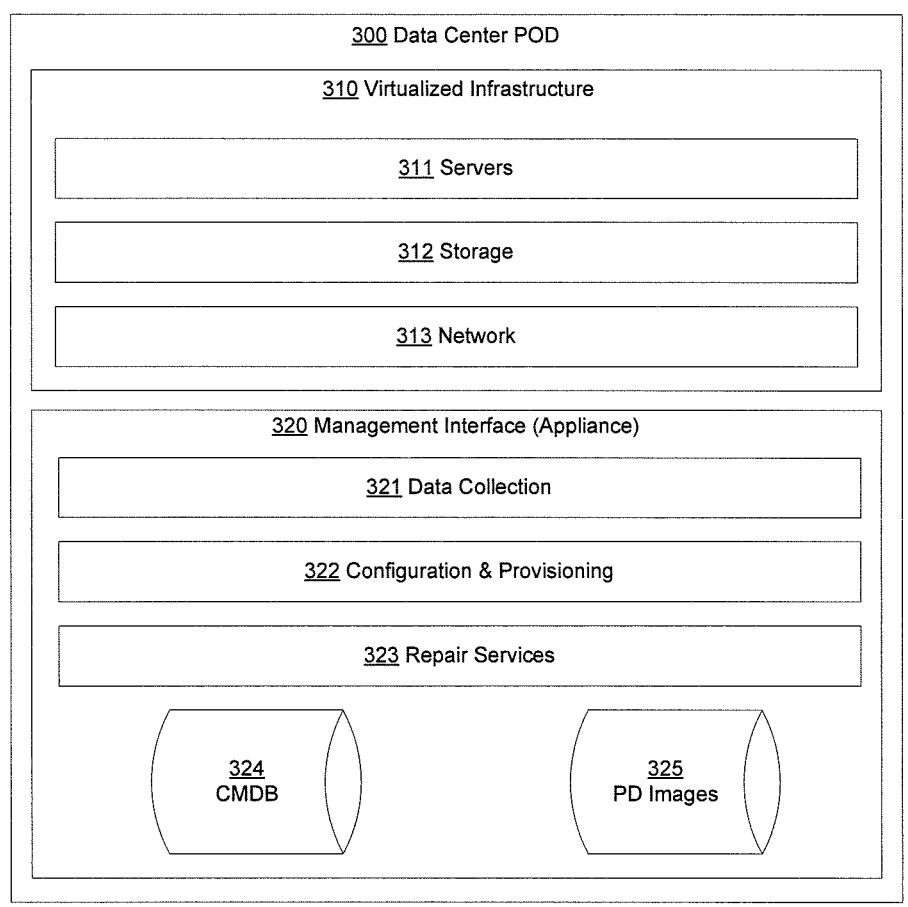
FIG. 3 shows an exemplary Point of Deployment system in accordance with an illustrative embodiment of the present invention.

FIG. 3 shows an exemplary architecture for a POD system 300 suitable for use in an embodiment of the present invention. For example, POD system 300 in FIG. 2 could be a more detailed view of one the POD systems 130 in FIG. 1.

POD system 300 generally comprises two major components: Virtualized Infrastructure 310 and Management Interface 320. Virtualized Infrastructure 310 typically represents resources with which a given POD system is associated. These resources typically comprise components within a data center, such as Servers 311, Storage 312, and Network 313.

Management Interface 320, also known as an Appliance, provides an interface for resource-level management. Data Collection module 321 is responsible for gathering and analyzing performance and availability data regarding the resources associated with the POD system. Detailed monitoring is performed by a POD system with respect to its resources, including the virtualized ones. Configuration and Provisioning module 322 is responsible for managing and altering the configuration of the resources, as well as provisioning of additional resources. Configuration and Provisioning module may utilize a CMDB 324 in a manner similar to that heretofore described with reference to CMDB 237 in FIG. 2. Repair Services 323 is responsible for correcting errors and problems with the resources, and may use a PD image repository 325 in a manner similar to that heretofore discussed with reference to PD image repository 238 in FIG. 2.

Figure 4:
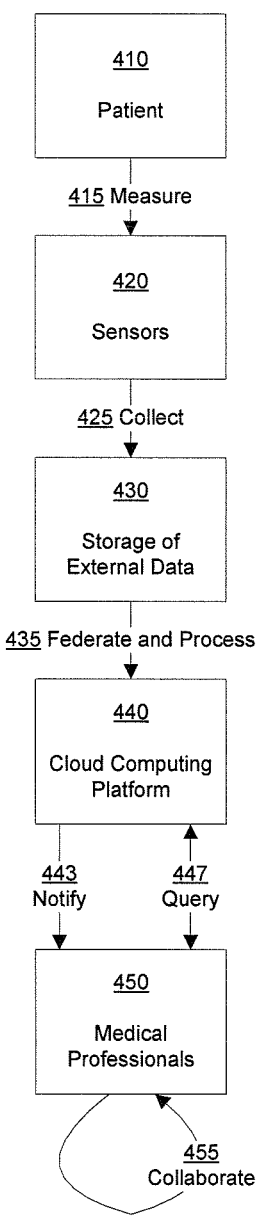
FIG. 4 shows an exemplary application-specific cloud computing platform in accordance with an illustrative embodiment of the present invention.

FIG. 4 shows an exemplary industry-specific cloud computing application 400 in accordance with an illustrative embodiment of the present invention. More particularly, cloud computing application 400 is targeted toward the healthcare industry. This application begins with patients 410, whose vital signs or other diagnostic criteria are measured 415 by sensors 420. The sensors 420 in turn provide data which is collected (acquired) 425 by external data storage 430.

External data storage 430 could include high-end archival storage connected to content. Examples of storage paradigms suitable for use with external data storage 430 include, for example, Scale out File Services (SoFS) and Scale out Network Attached Storage (SoNAS), both of which are commercially available from International Business Machines Corp. of Armonk, N.Y.

External data storage 430 could also include a scalable federated database infrastructure operative to provide performance and multi-tenancy for large numbers of clients of varying sizing. An example could be, for example, DB2 data sharing/accelerator. DB2 is a trademark of International Business Machines Corp. of Armonk, N.Y.

Cloud computing platform 440 could be a POD system of the type heretofore described with reference to elements 130 in FIGS. 1 and 300 in FIG. 3. Cloud computing platform 440 is operative to host healthcare specific client applications and to enable interaction with the other components of the modular cloud platform shown in FIG. 1 (e.g., interaction with the Cloud Operations Center for service management). Cloud computing platform 440 preferably provides a highly secure, highly scalable, elastic, on-demand virtual server infrastructure appropriate to serve the workload types specific to healthcare.

Cloud computing platform 440 preferably provides functionalities including, for example, one or more of data mining, data warehousing, text processing, and streaming data analytics. Cloud computing platform 440 could include, for example, an Analytics Cloud commercially available from International Business Machines Corp. of Armonk, N.Y. Cloud computing platform 440 preferably includes ETL (Extract-Transform-Load) infrastructure to quickly extract healthcare data in standard formats.

In an illustrative embodiment, cloud computing platform 440 includes a number of APIs. In addition to a POD system API heretofore described for modular integration, various healthcare-specific APIs could be provided, such as feedback to sensors and PDA devices. These APIs could be high-availability and highly-specialized mission-critical APIs for developers who need to access and utilize the infrastructures without worrying about implementation details.

Other APIs could include social network collaboration APIs to facilitate in finding experts and finding expertise. These could include healthcare-relevant collaboration APIs such as an infrastructure for trusted self-diagnostics applications. Other APIs could include APIs for simulating applications on top of existing data and an API for evidence generation.

Cloud computing platform 440 may be operative to provide notifications 443 to medical professionals 450. Notifications 443 could be provided via modalities such as, for example, electronic mail, world wide web (WWW), short messaging service (SMS), telephone, television, or broadcasting. These notifications 443 could be used by medical professionals 450 to, for example, formulate decisions about the care of patients 410, such as whether emergency medical services or other first responders would be needed to rescue the patients.

Cloud computing platform 440 may also be operative to accept queries 447 from medical professionals 450 and to provide appropriate responses to such queries. Moreover, cloud computing platform could also facilitate collaboration 455 among medical professionals 450 to enhance patient care.

Another example of an industry-specific POD system could be one oriented toward the transportation industry. This POD system could be operative to host transportation specific client applications and to enable interaction with the other components of the modular cloud platform shown in FIG. 1 (e.g., interaction with the Cloud Operations Center for service management). This POD system preferably provides a highly secure, highly scalable, elastic, on-demand virtual server infrastructure appropriate to serve the workload types specific to the transportation industry.

The POD system could also include high-end archival storage connected to content. Examples of suitable storage paradigms include, for example, Scale out File Services (SoFS) and Scale out Network Attached Storage (SoNAS), both of which are commercially available from International Business Machines Corp. of Armonk, N.Y.

A transportation-specific POD system could also include support for mobility and connectivity in public and private transportation, such as a mobile cloud or cloud roaming. Another possible feature would be a Web 2.0 based ability to communicate missions, goals and activities, as well as receive guidance from the general public and from localized constituencies. It could also be desirable to interface with government bodies such as, for example, the Travel Model Improvement Program and the Freight Analysis Framework, both of which are programs of the Federal Highway Administration.

In an illustrative embodiment, cloud computing platform 440 includes a number of APIs. In addition to a POD system API heretofore described for modular integration, various transportation-specific APIs could be provided to process various transportation-specific workloads. These APIs could be high-availability and highly-specialized mission-critical APIs for developers who need to access and utilize the infrastructures without worrying about implementation details.

Examples of such workloads include, for example, schedule optimization, route planning, shipment tracking, and delay forecasting. Another exemplary workload is travel demand behavior modeling, which could include simulation of social, demographic, and economic impact on travel demands and could also include financial analytics to produce a sustained competitive advantage.

One could also include a collaboration API, for example, to match customers to providers. It may also be desirable to include an API for "what if" analysis in order to assess possible future scenarios and needs, as well as to identify solutions to adapt to these alternative scenarios. Another possible API could include a marketplace API to match transportation services profiles with appropriate analytic services (e.g., analysis of needs or prices), weather forecasting services, urban pattern update requirements, etc. It may also be desirable to include an API for energy-efficiency and environmental sustainability compliance management via sensor data collection and report.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Such a system may include distinct software modules (for example, a partitioning module executing on a hardware processor). Furthermore, aspects of the present invention may take the form of a computer program product embodied in one or more computer readable medium(s) having computer readable program code embodied thereon.

Additionally, the techniques as heretofore described can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 5:
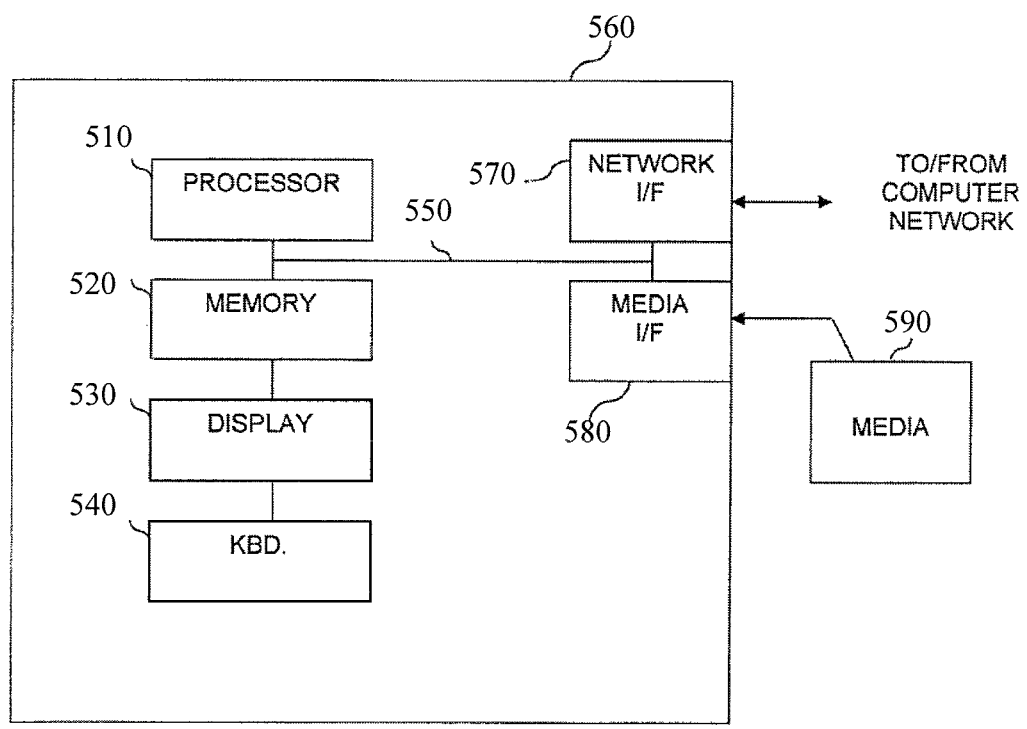
FIG. 5 shows a computer system that may be useful in implementing one or more aspects and/or elements of the invention.

One or more embodiments can make use of software running on a general purpose computer or workstation. With reference to FIG. 5, such an implementation employs, for example, a processor 510, a memory 520, and an input/output interface formed, for example, by a display 530 and a keyboard 540. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer). The processor 510, memory 520, and input/output interface such as display 530 and keyboard 540 can be interconnected, for example, via bus 550 as part of a data processing unit 560. Suitable interconnections, for example via bus 550, can also be provided to a network interface 570, such as a network card, which can be provided to interface with a computer network, and to a media interface 580, such as a diskette or CD-ROM drive, which can be provided to interface with media 590.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 590) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

A data processing system suitable for storing and/or executing program code can include at least one processor 510 coupled directly or indirectly to memory elements 520 through a system bus 550. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 540, display 530, pointing device, and the like) can be coupled to the system either directly (such as via bus 550) or through intervening I/O controllers (omitted for clarity).

Network adapters such as network interface 570 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 560 as shown in FIG. 5) running a server program. It will be understood that such a physical server may or may not include a display and keyboard.

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable storage medium. The method steps can then be carried out using the distinct software modules and/or sub-modules of the system, as described above, executing on a hardware processor. Further, a computer program product can include a tangible computer-readable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICs), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A cloud computing system, comprising:
a first computer coupled to one or more additional computers, wherein the first computer is configured to receive a service request from a user, determine at least one computer of said one or more additional computers to assign the service request to for executing the service request, and dispatch the service request to the at least one computer assigned to execute the service request;
wherein each of the one or more additional computers autonomously manages, independent of each other one of the one or more additional computers, a respective set of one or more virtualized computing resources that are respectively provisioned by the one or more additional computers, and collectively utilized to implement one or more services for executing the service request dispatched by the first computer;
wherein the one or more additional computers perform resource-level management and resource-level provisioning operations to provision the computing resources needed to implement the one or more services for executing the service request, and
wherein the one or more additional computers perform said resource-level management and resource-level provisioning operations independent of management assistance from the first computer such that the first computer requires no knowledge of the computing resources that are independently managed and provisioned by the one or more additional computers;
wherein each of the one or more additional computers comprises a modular system that autonomously manages and provisions its respective computing resources, which allows at least one of the one or more additional computers to be removed from the cloud computing system, or a new modular system to be added to the cloud computing system, without having to re-configure a centralized or distributed resource management system;
wherein each modular system comprises a virtualized infrastructure and a management interface, wherein the virtualized infrastructure is configured to represent computing resources associated with the modular system, and wherein the management interface is configured as an interface for resource-level management by collecting information regarding performance of the computing resources associated with the modular system, and managing and changing a provisioning of the computing resources associated with the modular system; and
wherein each of the first and the additional computers comprises a processor coupled to a memory.

2. The system of claim 1, wherein a given set of one or more virtualized computing resources comprises one or more computers other than the first and the additional computers.

3. The system of claim 1, wherein the at least one computer assigned to execute the service request is configured to:
receive the service request dispatched from the first computer;
provision at least a portion of the respective set of virtualized computing resources managed by the at least one computer; and
execute the service request utilizing the provisioned virtualized computing resources.

4. The system of claim 1, wherein a given one of the one or more additional computers has associated therewith a set of application program interfaces.

5. The system of claim 4, wherein the set of application program interfaces comprises one or more industry-specific application program interfaces.

6. The system of claim 1, wherein the one or more additional computers comprise a plurality of additional computers associated with respective specific functionalities.

7. The system of claim 1, wherein the first computer delegates one or more management actions to the one or more additional computers.

8. An apparatus comprising:
a memory comprising program instructions; and
a processor coupled to the memory, wherein the processor is operative to process the program instructions to execute a method to manage one or more additional computers that are part of a cloud computing system, wherein the processor manages the one or more additional computers by receiving a service request from a user, determining at least one computer of said one or more additional computers to assign the service request to for executing the service request, and dispatching the service request to the at least one computer assigned to execute the service request;
wherein each of the one or more additional computers autonomously manages, independent of each other one of the one or more additional computers, a respective set of one or more virtualized computing resources that are respectively provisioned by the one or more additional computers, collectively, to implement one or more services for executing the service request dispatched from the processor,
wherein the one or more additional computers perform resource-level management and resource-level provisioning operations to provision the computing resources needed to implement the one or more services for executing the service request,
wherein the one or more additional computers perform said resource-level management and resource-level provisioning operations independent of management assistance from the processor such that the processor requires no knowledge of the computing resources that are independently managed and provisioned by the one or more additional computers,
wherein each of the one or more additional computers comprises a modular system that autonomously manages and provisions its respective computing resources, which allows at least one of the one or more additional computers to be removed from the cloud computing system, or a new modular system to be added to the cloud computing system, without having to re-configure a centralized or distributed resource management system; and
wherein each modular system comprises a virtualized infrastructure and a management interface, wherein the virtualized infrastructure is configured to represent computing resources associated with the modular system, and wherein the management interface is configured as an interface for resource-level management by collecting information regarding performance of the computing resources associated with the modular system, and managing and changing a provisioning the computing resources associated with the modular system.

9. The apparatus of claim 8, wherein the service request comprises a request for at least one of a specified infrastructure and a specified platform.

10. The apparatus of claim 8, wherein the at least one computer assigned to execute the service request is configured to:
receive the dispatched service request;
provision at least a portion of the respective set of virtualized computing resources managed by the at least one computer; and
execute the service request utilizing the provisioned virtualized computing resources.

11. The apparatus of claim 8, wherein a given one of the one or more additional computers has associated therewith a set of application program interfaces.

12. The apparatus of claim 11, wherein the set of application program interfaces comprises one or more industry-specific application program interfaces.

13. The apparatus of claim 8, wherein the one or more additional computers comprise a plurality of additional computers associated with respective specific functionalities.

14. The apparatus of claim 8, wherein the processor is operative to delegate one or more management actions to the one or more additional computers.

15. An apparatus comprising:
a memory comprising program instructions; and
a processor coupled to the memory, wherein the processor is operative to process the program instructions to execute a method to manage an associated set of virtualized computing resources;
wherein the apparatus is one of a plurality of computers forming a cloud computing system, which autonomously manage, independent of each other one of the plurality of computers, respective sets of virtualized computing resources, wherein the apparatus manages its respective set of virtualized computing resources independent of management assistance from a managing computer of the cloud computing system,
wherein each of the plurality of computers forming the cloud computing system comprises a modular system that autonomously manages and provisions its respective computing resources, which allows at least one of the one or more additional computers to be removed from the cloud computing system, or a new modular system to be added to the cloud computing system, without having to re-configure a centralized or distributed resource management system; and
wherein each modular system comprises a virtualized infrastructure and a management interface, wherein the virtualized infrastructure is configured to represent computing resources associated with the modular system, and wherein the management interface is configured as an interface for resource-level management by collecting information regarding performance of the computing resources associated with the modular system, and managing and changing a provisioning of the computing resources associated with the modular system,
wherein the processor is further operative to process the program instructions to execute a method to:
receive a service request dispatched from the managing computer of the cloud computing system;
provision at least a portion of the set of virtualized computing resources managed by the apparatus, wherein the apparatus performs resource-level management and resource-level provisioning operations to provision the computing resources needed to execute the service request, wherein the apparatus performs said resource-level management and resource-level provisioning operations independent of management assistance from the managing computer such that the managing computer requires no knowledge of the computing resources that are independently managed and provisioned by the apparatus and others of the plurality of computers forming the cloud computing system; and execute the service request utilizing the provisioned virtualized computing resources.

16. The apparatus of claim 15, wherein the apparatus has associated therewith a set of application program interfaces.

17. The apparatus of claim 16, wherein the set of application program interfaces comprises one or more industry-specific application program interfaces.

18. A method of operating a cloud computing system, the cloud computing system comprising a first computer coupled to one or more additional computers, comprising the steps of:

dispatching a service request to one or more of the additional computers from the first computer; and each of the one or more additional computers autonomously managing, independent of each other one of the one or more additional computers, a respective set of virtualized computing resources, wherein managing a respective set of virtualized computing resources comprises:

receiving the service request dispatched from the first computer at a given one of the one or more additional computers;

provisioning by the given one of the one or more additional computers at least a portion of the respective set of virtualized computing resources managed by the given one of the one or more additional computers; and executing by the given one of the one or more additional computers the service request utilizing the provisioned virtualized computing resources, wherein the one or more additional computers perform resource-level management and resource-level provisioning operations independent of management assistance from the first computer such that the first computer requires no knowledge of the computing resources that are independently managed and provisioned by the one or more additional computers;

wherein each of the one or more additional computers comprises a modular system that autonomously manages and provisions its respective computing resources, which allows at least one of the one or more additional computers to be removed from the cloud computing system, or a new modular system to be added to the cloud computing system, without having to re-configure a centralized or distributed resource management system; and wherein each modular system comprises a virtualized infrastructure and a management interface, wherein the virtualized infrastructure is configured to represent computing resources associated with the modular system, and wherein the management interface is configured as an interface for resource-level management by collecting information regarding performance of the computing resources associated with the modular system, and managing and changing a provisioning of the computing resources associated with the modular system.

19. The method of claim 18, further comprising the steps of:

receiving a service request from a user at the first computer;

determining by the first computer at least one of the one or more additional computers to assign the service request to for executing the service request; and dispatching the service request from the first computer to the at least one computer assigned to execute the service request.

20. The method of claim 18, wherein the one or more additional computers comprise a plurality of additional computers associated with respective specific functionalities.

21. The method of claim 18, further comprising the step of delegating one or more management actions from the first computer to the one or more additional computers.

* * * * *